(12) United States Patent
Lee et al.

(10) Patent No.: US 8,331,735 B2
(45) Date of Patent: Dec. 11, 2012

(54) IMAGE DISPLAY APPARATUS AND METHOD

(75) Inventors: Ju-hwan Lee, Yongin-si (KR); Jong-ho Lea, Seongnam-si (KR); Sang-wook Park, Yongin-si (KR); Yeun-bae Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 538 days.

(21) Appl. No.: 12/149,749

(22) Filed: May 7, 2008

(65) Prior Publication Data

US 2009/0097748 A1   Apr. 16, 2009

(30) Foreign Application Priority Data

Oct. 16, 2007  (KR) .................. 10-2007-0104149

(51) Int. Cl.
*G06K 9/54* (2006.01)

(52) U.S. Cl. ....... 382/305; 358/1.18; 358/403; 358/442; 386/241; 705/36 R; 715/202; 715/788; 715/838; 725/46; 725/91

(58) Field of Classification Search .................. None
See application file for complete search history.

(56) References Cited

U.S. PATENT DOCUMENTS

| | | | | |
|---|---|---|---|---|
| 5,826,102 A * | 10/1998 | Escobar et al. | ............... | 715/202 |
| 7,890,882 B1 * | 2/2011 | Nelson | ........................... | 715/788 |
| 2002/0116716 A1 * | 8/2002 | Sideman | ........................ | 725/91 |
| 2003/0107777 A1 * | 6/2003 | Yamade et al. | ............... | 358/442 |
| 2003/0231345 A1 * | 12/2003 | Azami | ........................ | 358/1.18 |
| 2004/0025180 A1 * | 2/2004 | Begeja et al. | .................. | 725/46 |
| 2005/0044091 A1 * | 2/2005 | Nakamura et al. | ............ | 707/100 |
| 2007/0027788 A1 * | 2/2007 | Bandman et al. | ............ | 705/36 R |
| 2007/0047012 A1 * | 3/2007 | Bryant | ........................ | 358/403 |
| 2007/0198951 A1 * | 8/2007 | Frank | ........................... | 715/838 |
| 2007/0286579 A1 * | 12/2007 | Murabayashi et al. | ......... | 386/96 |

FOREIGN PATENT DOCUMENTS

| | | |
|---|---|---|
| JP | 2005-236646 | 9/2005 |
| JP | 2005-192223 | 7/2008 |
| KR | 10-2005-0082378 | 8/2005 |
| KR | 10-2007-0052554 | 5/2007 |

* cited by examiner

*Primary Examiner* — Tsung-Yin Tsai
(74) *Attorney, Agent, or Firm* — Staas & Halsey LLP

(57) ABSTRACT

Provided are an image display apparatus and method which enables a user to quickly and easily obtain information related to an image currently being reproduced. The image display apparatus includes: a setting module setting a plurality of sub regions into which a predetermined image frame of an image being played back are divided according to color; and a mapping module mapping one or more thumbnail images of one or more relevant contents related to the image to one or more sub regions selected from the sub regions.

22 Claims, 11 Drawing Sheets

IMAGE DISPLAY APPARATUS AND METHOD

CROSS-REFERENCE TO RELATED APPLICATION

This application claims priority from Korean Patent Application No. 10-2007-0104149 filed on Oct. 16, 2007 in the Korean Intellectual Property Office, the disclosure of which is incorporated herein by reference in its entirety.

BACKGROUND OF THE INVENTION

1. Field of the Invention

The present invention relates to an image display apparatus and method, and more particularly, to an image display apparatus and method which enables a user to quickly and easily obtain information related to an image currently being reproduced.

2. Description of the Related Art

A service of providing multimedia contents, such as moving images or still images, on an image display apparatus is gradually evolving from a unidirectional service to a bidirectional service. In the unidirectional service, a service provider provides multimedia contents to a user. In the bidirectional service, a service provider and a user can communicate with each other.

As the service of providing multimedia contents evolves into the bi-directional service, there is a growing demand for image display apparatuses, which can be connected to an Internet network, such as Internet protocol televisions (IP-TVs), personal computers (PCs) and mobile devices. These image display apparatuses play back images using built-in software which is needed to play back images in a predetermined format.

However, it is difficult to search for and obtain information related to an image, which is currently being played back, using a conventional image display apparatus. For example, while viewing a moving image on a PC, a user may want to search for information related to the moving image, such as news articles or other moving images produced by a producer of the moving image currently being played back. In this case, the user may stop or temporarily stop the moving image which is currently being played back. Then, the user may access the Internet, input a keyword for the moving image, which is currently being played back, to search for information related to the moving image, and obtain the information. That is, when using a conventional image display apparatus, a user has to go through a number of stages before obtaining information related to a moving image which is currently being played back.

Therefore, a technology, which enables a user to quickly and easily obtain information related to an image currently being played back, is required.

SUMMARY OF THE INVENTION

Aspects of the present invention provide an image display apparatus and method which enables a user to quickly and easily obtain information related to an image currently being played back.

However, aspects of the present invention are not restricted to the one set forth herein. The above and other aspects of the present invention will become-more apparent to one of ordinary skill in the art to which the present invention pertains by referencing the detailed description of the present invention given below.

According to an aspect of the present invention, there is provided an image display apparatus including: a setting module setting a plurality of sub regions into which a predetermined image frame of an image being played back are divided according to color; and a mapping module mapping one or more thumbnail images of one or more relevant contents related to the image to one or more sub regions selected from the sub regions.

According to another aspect of the present invention, there is provided an image display method including: setting a plurality of sub regions into which a predetermined image frame of an image being played back are divided according to color; and mapping one or more thumbnail images of one or more relevant contents related to the image to one or more sub regions selected from the sub regions.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
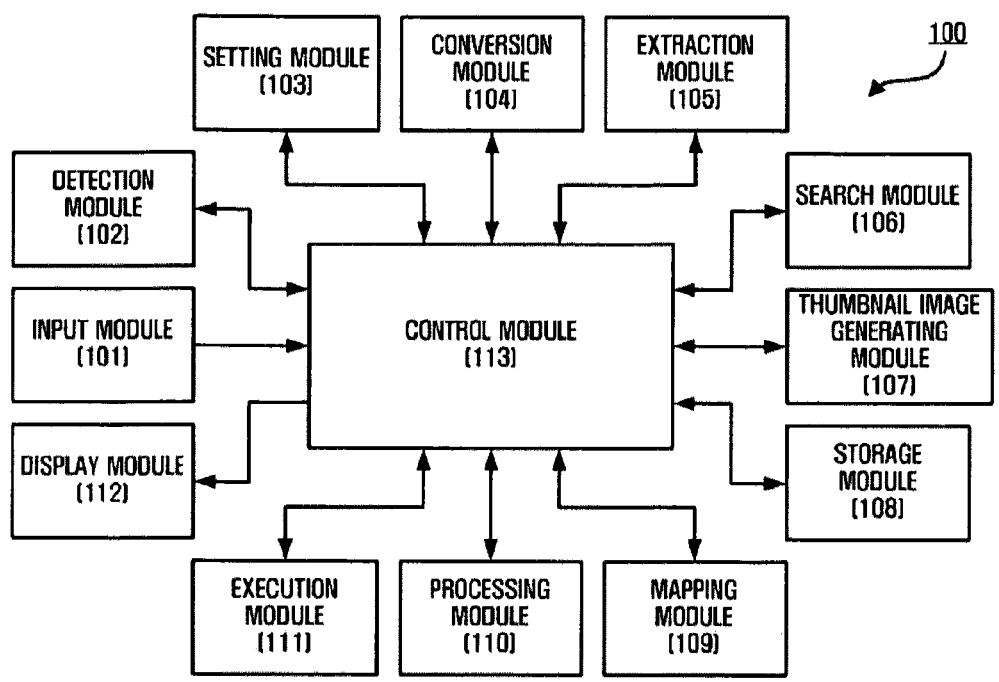
FIG. 1 is a block diagram of an image display apparatus according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Hereinafter, an image display apparatus and method according to embodiments of the present invention will be described with reference to block diagrams or flowchart illustrations. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

An image display apparatus according to exemplary embodiments of the present invention can play back multimedia contents. In this case, a multimedia content refers to a digital object which includes at least one of video information, audio information and text information. Specific examples of multimedia contents include moving images, still images, music, Java games, electronic books, and various digital broadcasts such as digital multimedia broadcasts, digital video broadcasts and digital audio broadcasts.

As used herein, the term 'play back' denotes visually or acoustically representing multimedia contents so that a user can use the multimedia contents. Examples of the playback type of the multimedia contents include 'Play,' 'Display,' 'Execute,' and 'Print.' 'Play' is to represent a multimedia content in an audio/video form. For example, if the multimedia content is a moving image or music, the playback type of the multimedia content may be 'Play.' In addition, 'Display' is to present a multimedia content on a visual device, and 'Print' is to generate a hard copy of the multimedia content. For example, if the multimedia content is a still image, the playback type of the multimedia content may be at least one of 'Display' and 'Print.' 'Execute' is to use content such as a game or an application program. For example, if a multimedia content is a Java game, the playback type of the multimedia content may be 'Execute.'

When receiving a predetermined command while playing back a multimedia content, the image display apparatus may search for other contents (hereinafter, referred to as 'relevant contents') related to the multimedia content which is currently being played back. For example, when receiving a pause command while playing back a moving image, the image display apparatus may search for relevant contents of the moving image which is currently being played back. Examples of the relevant contents include others frames in the moving image currently being played back, moving images (for example, other moving images produced by a producer of the moving image which is currently being played back), still images, music, books, websites and articles related to the moving image which is currently being played back. In order to search for the relevant contents, the image display apparatus may be connected to, for example, an Internet network (not shown).

Once the relevant contents are found, the image display apparatus may generate thumbnail images for all of the found relevant contents. Then, the image display apparatus may map the generated thumbnail images to a plurality sub regions selected from the moving image based on color and provide the mapping results to users. Here, the thumbnail images may be simultaneously displayed in the sub regions which were selected based on color. Alternatively, the thumbnail images may be sequentially displayed in the selected sub regions at predetermined time intervals.

A case where all thumbnail images are simultaneously mapped to a plurality of sub regions selected based on color will be described below as an exemplary embodiment of the present invention. In addition, a case where all thumbnail images are sequentially mapped to a sub region, which is selected based on color, at predetermined time intervals will be described below as another exemplary embodiment of the present invention. For the simplicity of description, moving images and still images may be used as examples of multimedia contents which are played back by the image display apparatus.

An image display apparatus and method according to an exemplary embodiment of the present invention will now be described with FIGS. 1 through 8.

FIG. 1 is a block diagram of an image display apparatus 100 according to an exemplary embodiment of the present invention. Referring to FIG. 1, the image display apparatus 100 according to the present embodiment includes an input module 101, a detection module 102, a setting module 103, a conversion module 104, an extraction module 105, a search module 106, a thumbnail image generating module 107, a storage module 108, a mapping module 109, a display module 112, a processing module 110, an execution module 111, and a control module 113.

The input module 101 may receive a command (such as a pause command) for requesting relevant contents of a moving image (or a still image) which is currently being played back. The input module 101 may also receive commands required to play back a moving image, such as playback, stop, and volume up/down commands. To this end, the input module 101 may include a plurality of keys. For example, the input module 101 may include a play key for playing back a moving image, a pause key for temporarily stopping a moving image which is currently being played back, and a stop key for stopping a moving image which is currently being played back. These keys may be implemented as software, such as icons of a graphical user interface (GUI), or implemented as hardware. Alternatively, the keys may be implemented as a combination of hardware and software.

The detection module 102 may detect a facial region in a moving-image frame (hereinafter, referred to as a 'frame') at a time when the pause command is input. For example, the detection module 102 may detect a facial region in a frame with reference to pre-stored skin color information. Specifically, the detection module 102 may detect pixels, which have values corresponding to skin color and are successively arranged, from all pixels that form a frame. In so doing, the detection module 102 may detect a facial region of the frame.

In addition, the detection module 102 may perform edge detection to detect a facial region in a frame. Specifically, the detection module 102 may detect edges in a frame, compare the detected edges to pre-stored position information of eyes, a nose and lips, and determine a region, in which the similarity between the detected edges and the position information exceeds a predetermined level, as a facial region of the frame. After detecting the facial region of the frame, the detection module 102 may provide information regarding a region excluding the facial region, that is, a background region, to the setting module 103.

The setting module 103 may group together pixels, which have values within a predetermined range, from among pixels included in the background region of the frame and set the group as a sub region.

Specifically, a pixel value can be represented by a plurality of components in a predetermined color space. Therefore, the setting module 103 may put each pixel, each of whose components is within a predetermined range, from among the pixels included in the background region in a group and set the group as a sub region. For example, a pixel value can be represented by R indicating a red (R) component, G indicating a green (G) component, and B indicating a blue (B) component in an RGB color space. In this case, the setting module 103 may select pixels from the pixels included in the background region. Here, each of the selected pixels may have the R, G and B components, each of which is within the range of 0 to 30. Then, the setting module 103 may put the selected pixels in a group and set the group as a first sub region. In addition, the setting module 103 may put each pixel, each of whose R, G and B components is within the range of 31 to 60, in a group and set the group as a second sub region.

As described above, the ranges of the R, G and B components required to group pixels into a specified sub region may be equal to or different from one another. Specifically, the setting module 103 may put pixels, each of which has the R component in the range of 0 to 30, the G component in the range of 10 to 30 and the B component within the range of 5 to 40, in a group and set the group as the first sub region.

Figure 2:
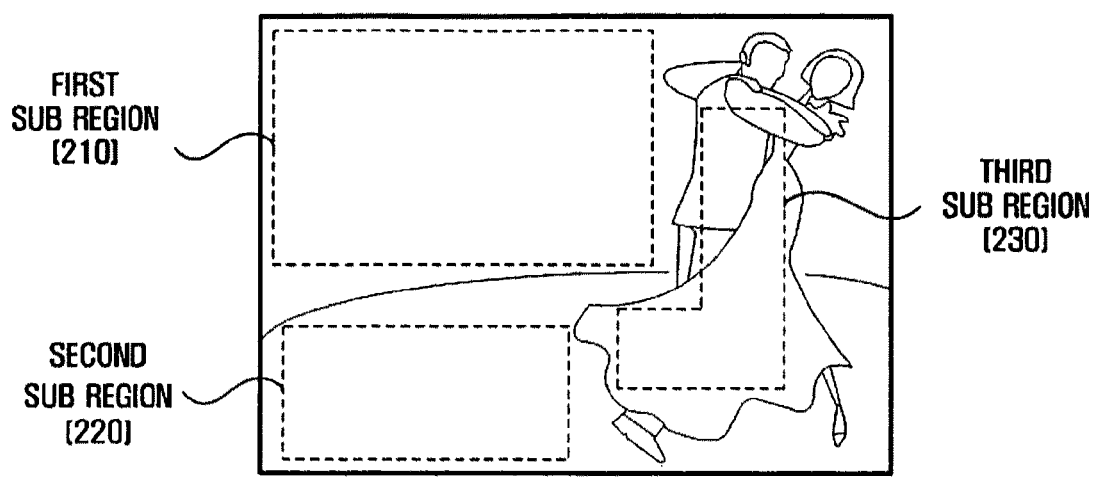
FIGS. 2 and 3 show moving-image frames in which a plurality of sub regions are set according to an exemplary embodiment of the present invention.
Figure 3:
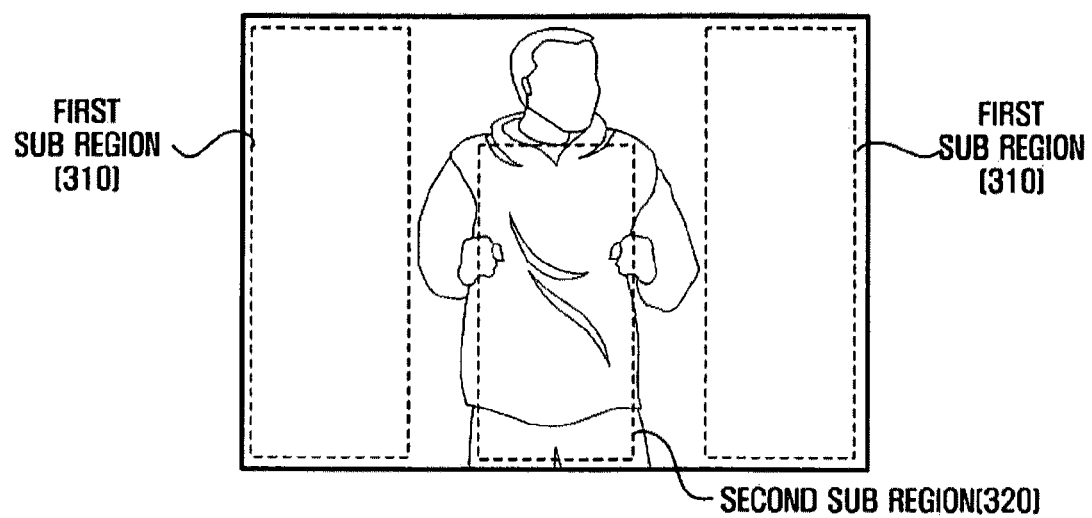

After pixels having values within a predetermined range are grouped together to set a sub region as described above, a frame may include one or more sub regions into which pixels have been grouped based on the same range of pixel values, which will now be described in more detail with reference to FIGS. 2 and 3. Referring to a frame illustrated in FIG. 2, a background region of the frame includes a first sub region 210, a second sub region 220 and a third sub region 230. On the other hand, referring to a frame illustrated in FIG. 3, a background region of the frame includes two first sub regions 310 and a second sub region 320.

Referring back to FIG. 1, a pixel value in the RGB color space has been described in the above examples. However, the pixel value can also be represented in various ways according to the type of color space. For example, a pixel value may be represented by L* indicating lightness, C* indicating chroma and h indicating color in a commission Internationale de l'Eclairage (CIE) lightness, chroma and hue (LCH) color space. In addition, a pixel value may be represented by L* indicating lightness, a* indicating the degree of red and green and b* indicating the degree of yellow and blue in a CIE L*a*b* (CIE LAB) color space.

As described above, a pixel value can be represented in various manners according to the type of color space. If a signal format of a frame is different from a reference signal format used to set sub regions, the signal format of the frame may be converted into the reference signal format before the sub regions are set. For example, if a frame has an RGB signal format and if the reference signal format is a signal format in the CIE LCH color space, the signal format of the frame may be converted into the signal format in the CIE LCH color space. This signal format conversion may be performed by the conversion module 104.

When the pause command is input, the extraction module 105 may extract a keyword required to search for relevant contents. Examples of the keyword may include the title, genre, producer, provider and main character of a moving image. The keyword may be added by a producer of a moving image as additional information about the moving image when the producer produces the moving image or may be provided by an external device (not shown).

The search module 106 may search for relevant contents of a moving image, which is currently being played back, using a keyword extracted by the extraction module 105. For example, the search module 106 may search for still images, moving images, music, articles, books and websites which are related to a moving image currently being played back. If a plurality of keywords are extracted by the extraction module 105, the search module 106 may search for the relevant contents using each of the keywords. For example, if the extraction module 105 extracts the title and producer of a moving image, which is currently being played back, as keywords, the search module 106 may search for the relevant contents using title and then producer.

A classification module (not shown) may classify found relevant contents by category. Examples of the category may include other works produced by the producer of a moving image which is currently being played back, other works featuring a main character of the moving image which is currently being played back, information about the main character, information about the moving image which is currently being played back, and articles about the moving image which is currently being played back. The classification module may classify the found relevant contents based on the above categories.

The thumbnail image generating module 107 may generate thumbnail images of relevant contents which are classified by category. A thumbnail image may include at least one of a representative image and a text of a relevant content. For example, if a relevant content is a moving image, a thumbnail image of the moving image may include a representative image of the moving image and the title of the moving image. If the relevant content is a still image, a thumbnail image of the still image may include a reduced version of the still image. If the relevant content is a text, a thumbnail image of the text may include the title of the text or an initial portion of the entire text.

When generating thumbnail images as described above, the thumbnail image generating module 107 may adjust the size of the thumbnail images according to at least one of the number of relevant contents included in each category and the size of a sub region, to which thumbnail images in a specified category are to be mapped, from among a plurality of sub regions included in a frame.

For example, it may be assumed that the number of first relevant contents in a first category 'other works of a main character' is greater than the number of second relevant contents in a second category 'relevant articles.' In this case, if a first sub region to which thumbnail images of the first relevant contents are to be mapped is the same size as a second sub region to which thumbnail images of the second relevant contents are to be mapped, the thumbnail image generating module 107 may reduce the thumbnail images of the first relevant contents to be smaller than the thumbnail images of the second relevant contents.

Figure 4:
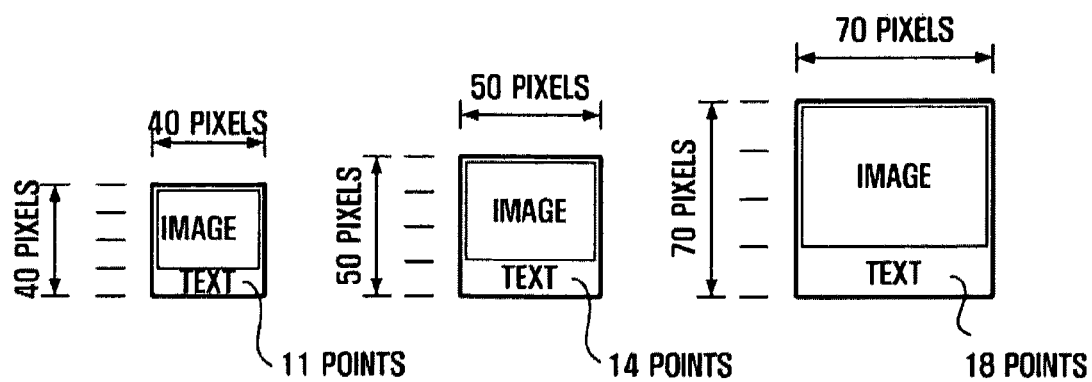
FIG. 4 shows thumbnail images of different sizes according to an exemplary embodiment of the present invention.

Specifically, referring to FIG. 4, it may be assumed that a thumbnail image composed of 50×50 pixels is of a standard size. In this case, when generating the thumbnail images of the first relevant contents, the thumbnail image generating module 107 may reduce the size of the thumbnail images to a size of 40×40 pixels. On the other hand, when generating the thumbnail images of the second relevant contents, the thumbnail image generating module 107 may increase the size of the thumbnail images to a size of 70×70 pixels.

If the number of the first relevant contents is equal to that of the second relevant contents and if the first sub region is narrower than the second sub region, the thumbnail image generating module 107 may adjust the thumbnail images of the first relevant contents to be smaller than the thumbnail images of the second relevant contents.

In addition, the thumbnail image generating module 107 may adjust the clearness of a thumbnail image of each relevant content based on the number of times that the relevant content has been used. For example, as the number of times that a specified relevant content is used increases, the thumbnail image generating module 107 may adjust a thumbnail image of the relevant content to become clearer.

Figure 5:
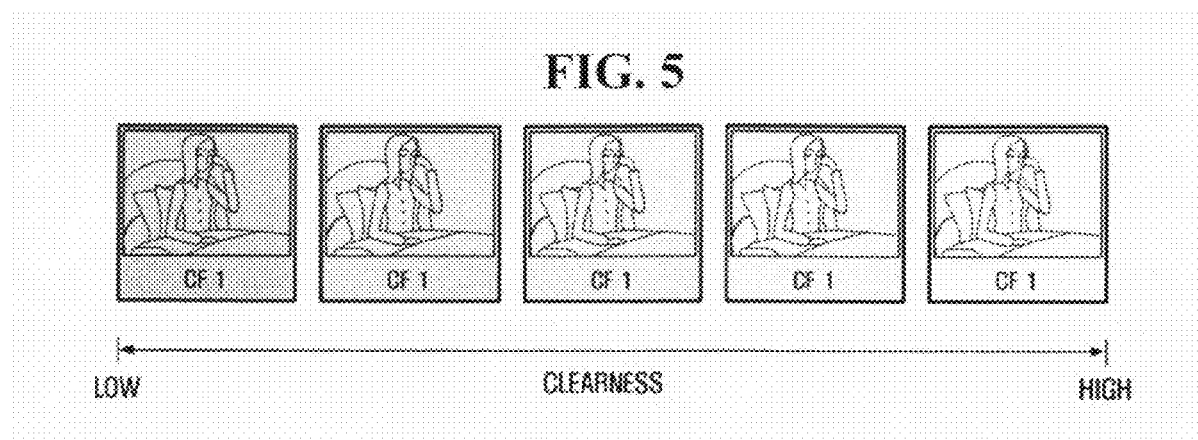
FIG. 5 shows thumbnail images having different clearness levels according to an exemplary embodiment of the present invention.

FIG. 5 shows the clearness of a thumbnail image of a relevant content which is represented at five levels according to the number of times that the relevant content has been used. Specifically, when a maximum number of times that a relevant content has been used is 100%, if the number of times that a specified relevant content has been used falls within the range of 0 to 20%, the clearness of a thumbnail image of the specified relevant content may be set highest. That is, the thumbnail image of the specified relevant content may be set clearest. If the number of times that the specified relevant content has been used falls within the range of 81 to 100%, the clearness of the thumbnail image of the specified relevant content may be set lowest. That is, the thumbnail image of the specified relevant content may be set opaque.

If the clearness of a thumbnail image of each relevant content is adjusted according to the number of times that the relevant content has been used, when a frame to which thumbnail images are mapped is displayed, a user can intuitively recognize a relevant content which has frequently been used and thus easily select the relevant content.

The storage module 108 stores thumbnail images generated by the thumbnail image generating module 107. Here, the thumbnail images may be classified by category and stored accordingly. In addition, the storage module 108 may store information required to adjust the clearness of the thumbnail images and algorithms required to play back moving images or still images. The storage module 108 may be implemented as a nonvolatile memory, such as a cache, a read-only memory (ROM), a programmable read-only memory (PROM), an erasable programmable read-only memory (EPROM), an electrically erasable programmable read-only memory (EEPROM) or a flash memory, or a volatile memory such as a random access memory (RAM). However, the present invention is not limited thereto.

The mapping module 109 may map thumbnail images in each category to each sub region. Here, a sub region to which thumbnail images included in a specified category are to be mapped may be determined according to the number of relevant contents in the specified category. Specifically, when found relevant contents are classified by category, if a specified category includes a greater number of relevant contents than other categories, thumbnail images of the relevant contents in the specified category may be mapped to a larger sub region.

Figure 6:
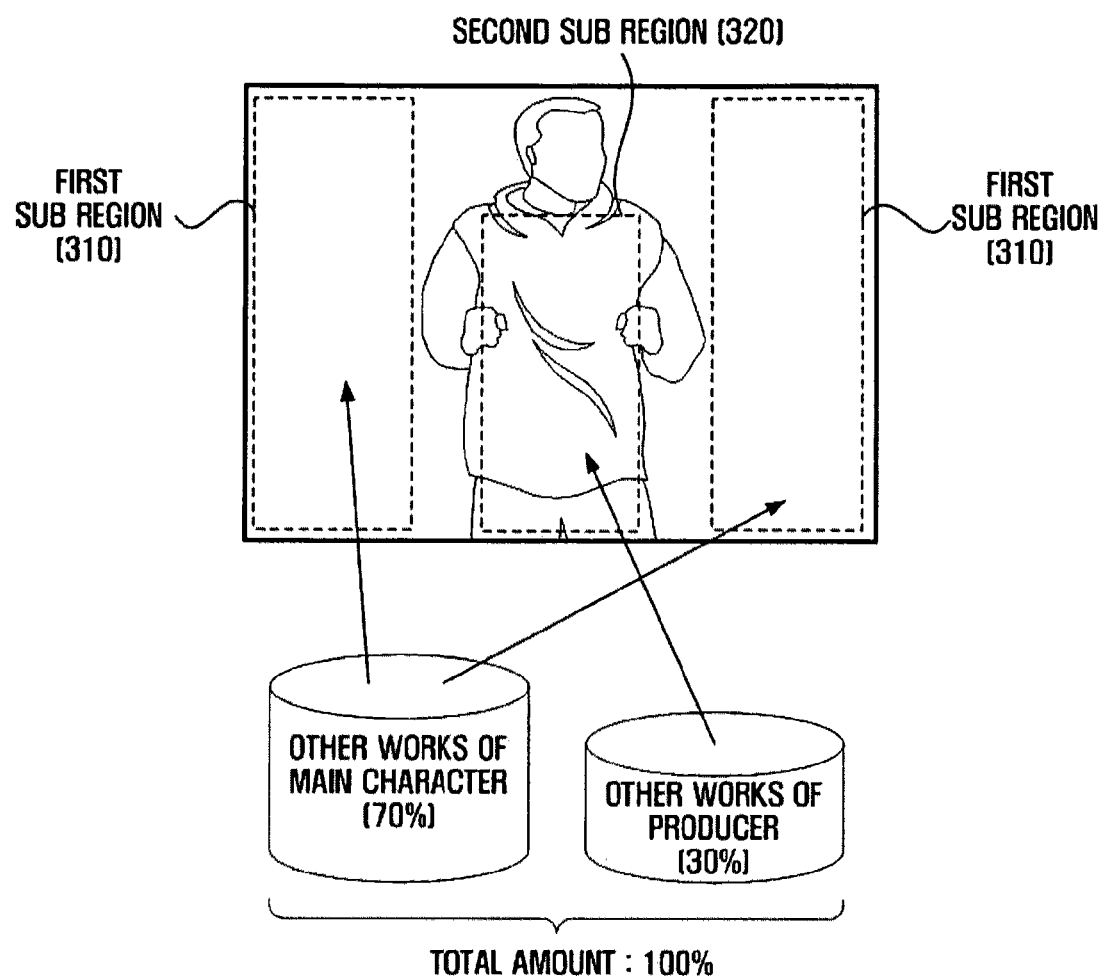
FIG. 6 shows the relationship between the amount of relevant contents in each category and a sub region to which thumbnail images of the relevant contents in each category are to be mapped.

FIG. 6 shows the relationship between the number of relevant contents in each category and a sub region to which thumbnail images of the relevant contents in each category are to be mapped.

Figure 7A:
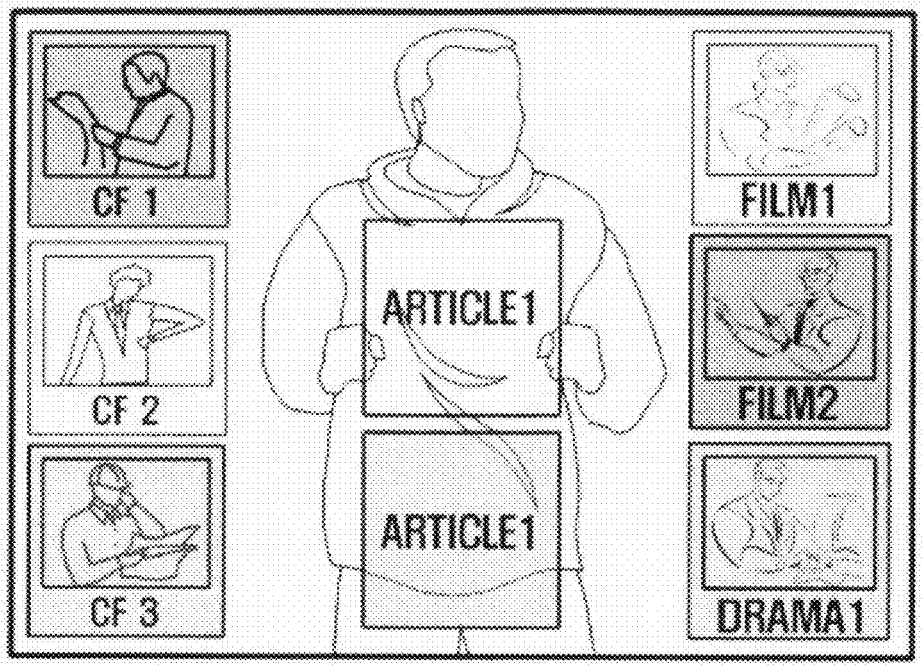
FIGS. 7A and 7B show moving-image frames to which thumbnail images are mapped according to an exemplary embodiment of the present invention.

Specifically, it may be assumed that a total amount of found relevant contents is 100% and that the amount of relevant contents in the first category 'other works of a main character' and the amount of relevant contents in the second category 'relevant articles' are 70% and 30%, respectively. In this case, the mapping module 109 may map thumbnail images of the relevant contents in the first category to the first sub regions 310. In addition, the mapping module 109 may map thumbnail images of the relevant contents in the second category to the second sub region 320. Consequently, a frame in which thumbnail images in each category are mapped to a background region can be provided as shown in FIG. 7A.

Referring back to FIG. 1, the display module 112 may display the result of processing a user command. For example, the display module 112 may display a frame, in which thumbnail images are mapped to a background region, as shown in FIG. 7A. The display module 112 may be, but is not limited to, a liquid crystal display (LCD).

Figure 7B:
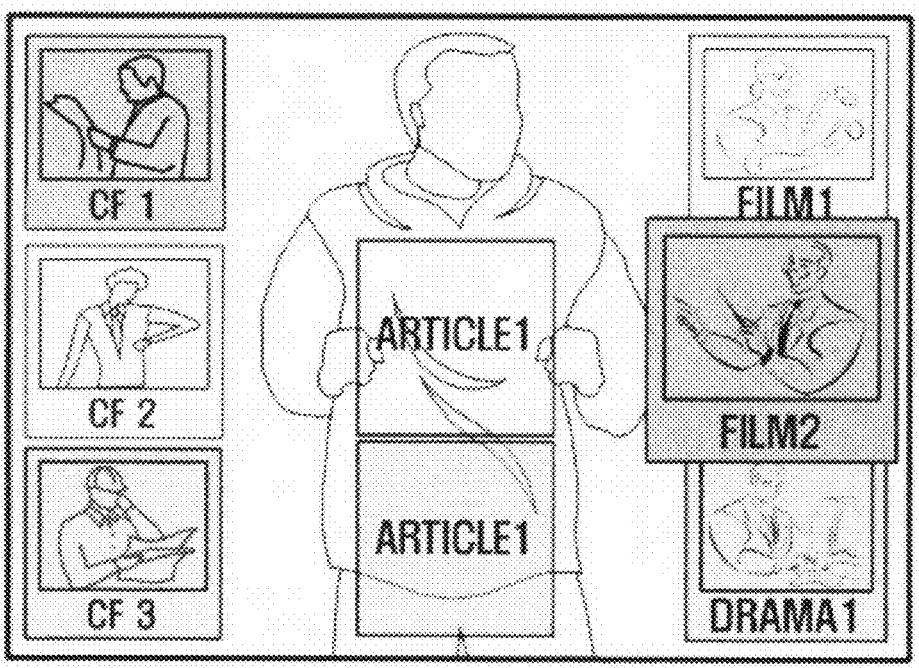

When one of displayed thumbnail images is focused on, the processing module 110 may enlarge the focused thumbnail image based on a predetermined standard as shown in FIG. 7B. For example, if a thumbnail image composed of 40×40 pixels is focused on, the processing module 110 may enlarge the focused thumbnail image to 70×70 pixels. If a thumbnail image composed of 50×50 pixels is focused on, the processing module 110 may enlarge the focused thumbnail image to 80×80 pixels. Information required to enlarge a thumbnail image may be stored in the storage module 108 described above.

When a thumbnail image is selected from displayed thumbnail images, the execution module 111 may download or play back a relevant content linked to the selected thumbnail image. Specifically, if the relevant content linked to the selected thumbnail image is a web page, the execution module 111 may display the web page on the display module 112. If the relevant content linked to the selected thumbnail image is another frame in a moving image which is currently being played back, the execution module 111 may play back the moving image from the frame. If the relevant content linked to the selected thumbnail image is another moving image, the execution module 111 may play back the moving image. Since the execution module 111 downloads or plays back a thumbnail image selected by a user, the user can quickly obtain information related to a moving image which is currently being played back.

The control module 113 connects and manages all components of the image display apparatus 100.

Figure 8:
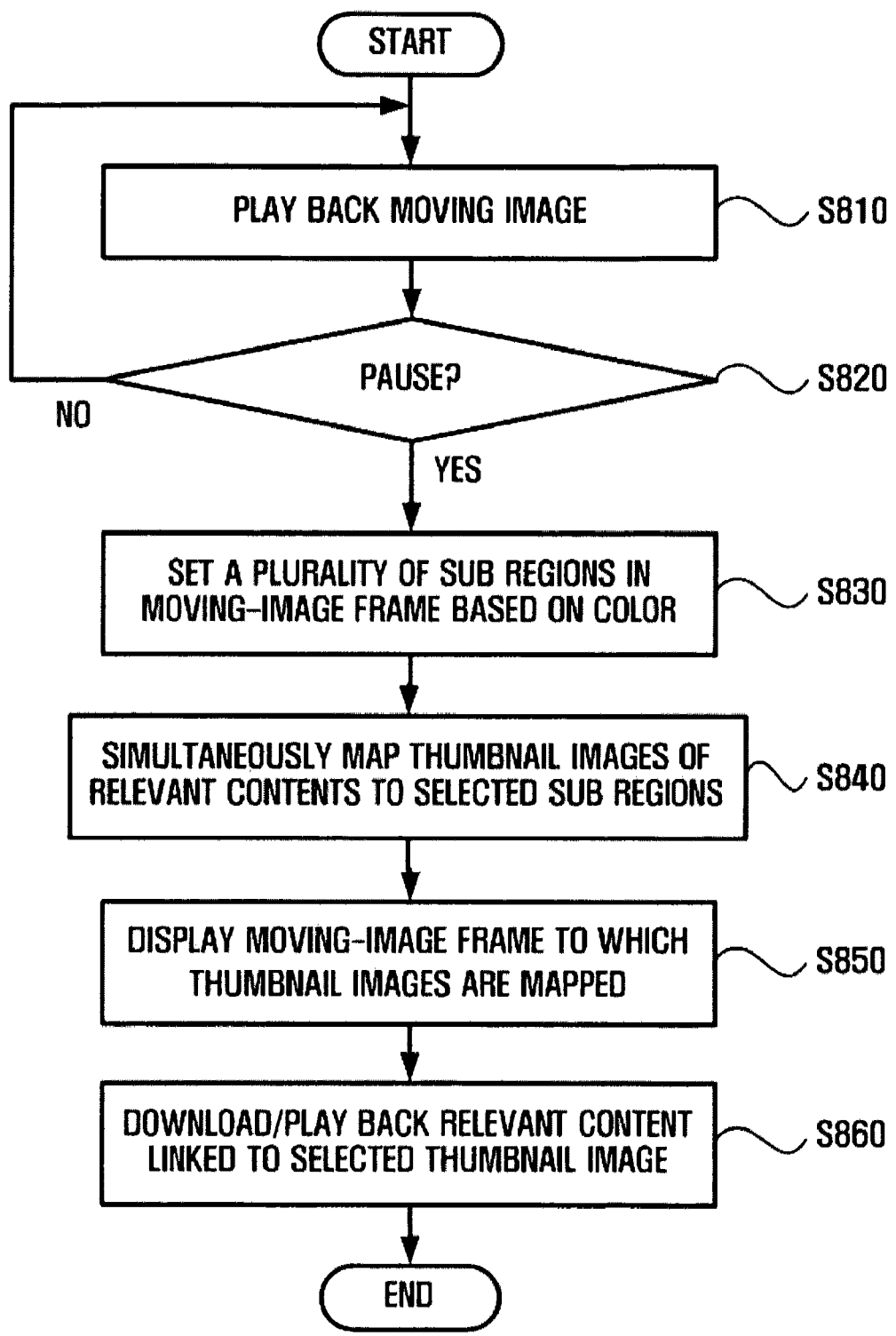
FIG. 8 is an image display method according to an exemplary embodiment of the present invention.

FIG. 8 is an image display method according to an exemplary embodiment of the present invention.

Referring to FIG. 8, if a pause command is input while a moving image is being played back (yes to a question raised in operation S820), a plurality of sub regions may be set based on color in a moving-image frame at a time when the pause command is input (operation S830). Operation S830 may include converting a signal format of the moving-image frame into a reference signal format in order to set sub regions, detecting a facial region in the moving-image frame in the reference format, putting pixels, which have values within a predetermined range, from among pixels included in a background region excluding the facial region in a group, and setting the group as a sub region.

If the sub regions are set, all thumbnail images of relevant contents of the moving image, which is being played back, may be simultaneously mapped to selected sub regions (operation S840). Operation 840 may include extracting a keyword required to search for the relevant contents, searching for the relevant contents using the extracted keyword, classifying the found contents by category, generating thumbnail images of the relevant contents which are classified by category, and determining a sub region, to which thumbnail images in each category are to be mapped, based on the number of relevant contents included in each category.

Here, the generating of the thumbnail images may include adjusting the size of the thumbnail images for each category according to the number of relevant contents included in each category and adjusting the clearness of a thumbnail image of each relevant content according to the number of times that the relevant content has been used.

After all thumbnail images in each category are simultaneously mapped to a corresponding sub region (operation S840), the moving-image frame, to which the thumbnail images were simultaneously mapped, may be displayed (operation S850).

When one of the displayed thumbnail images is selected, a relevant content linked to the selected thumbnail image may be downloaded or played back (operation S860).

According to the image display apparatus and method described above, relevant contents of a moving image, which is being played back, are searched for, and thumbnail images of the found relevant contents are generated. Then, all of the thumbnail images are mapped to a plurality of sub regions which are selected from a specified frame of the moving image based on color.

Hereinafter, an image display apparatus and method, in which thumbnail images are sequentially mapped to a sub region at predetermined time intervals, according to another exemplary embodiment of the present invention will be described with reference to FIGS. 9 through 11.

Figure 9:
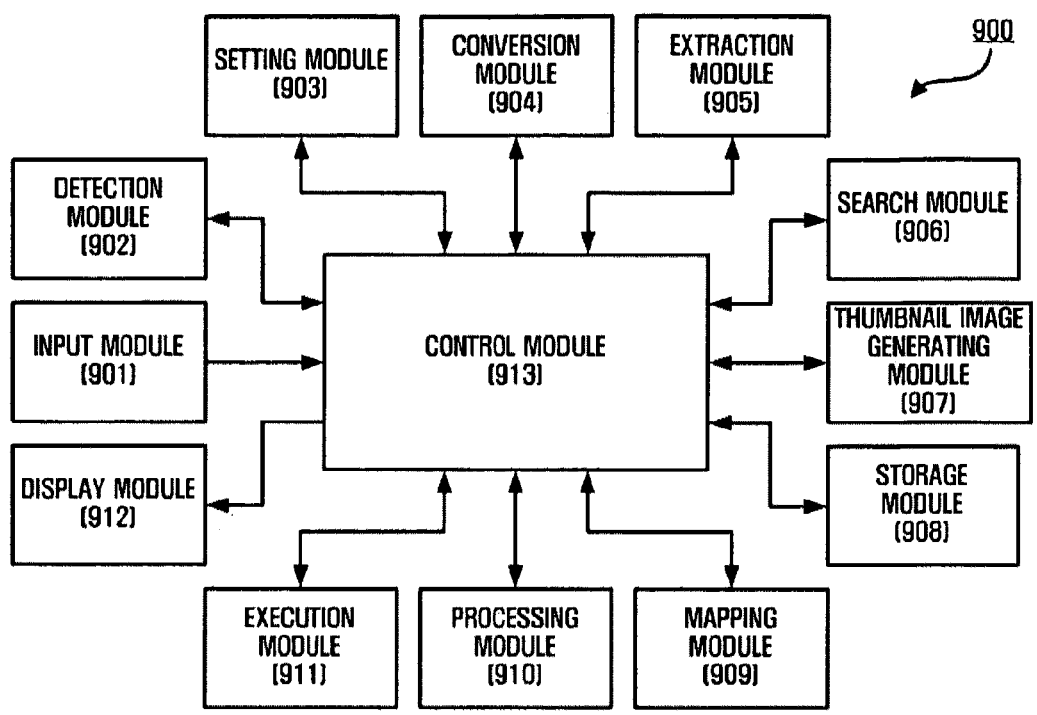
FIG. 9 is a block diagram of an image display apparatus according to another exemplary embodiment of the present invention.
Figure 10:
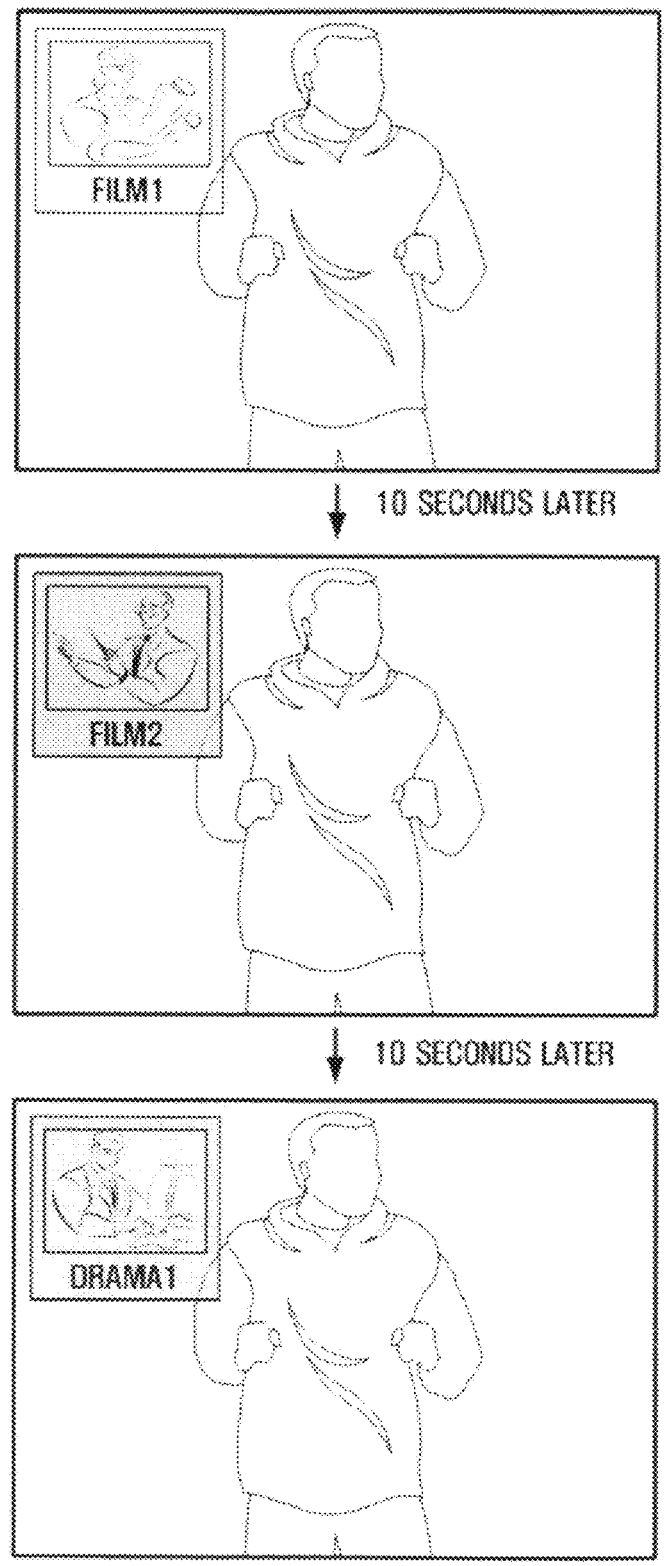
FIG. 10 shows a moving-image frame to which thumbnail images are mapped according to an exemplary embodiment of the present invention.

FIG. 9 is a block diagram of an image display apparatus 900 according to another exemplary embodiment of the present invention. Referring to FIG. 9, the image display apparatus 900 according to the present embodiment includes an input module 901, a detection module 902, a setting module 903, a conversion module 904, an extraction module 905, a search module 906, a thumbnail image generating module 907, a storage module 908, a mapping module 909, a processing module 910, a display module 912, an execution module 911, and a control module 913.

The input module 901, the detection module 902, the setting module 903, the conversion module 904, the extraction module 905, the search module 906, the storage module 908, the processing module 910, the display module 912, the execution module 911 and the control module 913 included in the image display apparatus 900 according to the present embodiment function in the same way as those of the image display apparatus 100 according to the previous embodiment of the present invention, and thus a detailed description thereof will be omitted. Instead, a description of the present embodiment will focus on the thumbnail image generating module 907 and the mapping module 909.

The thumbnail image generating module 907 may generate thumbnail images of relevant contents which are classified by category. Here, the sizes of all thumbnail images may be adjusted to that of a sub region which is larger than other sub regions included in a frame.

The mapping module 909 may sequentially map the thumbnail images in each category to the sub region, which is larger than the sub regions included in the frame, at predetermined time intervals. For example, the mapping module 909 may sequentially map the thumbnail images at intervals of ten seconds as shown in FIG. 10. When sequentially mapping the thumbnail images at predetermined time intervals, the mapping module 909 may map thumbnail images in a category, which includes a largest number of relevant contents, before other thumbnail images. Alternatively, the mapping module 909 may map thumbnail images of relevant contents, which have been more frequently been used, before other thumbnail images.

Figure 11:
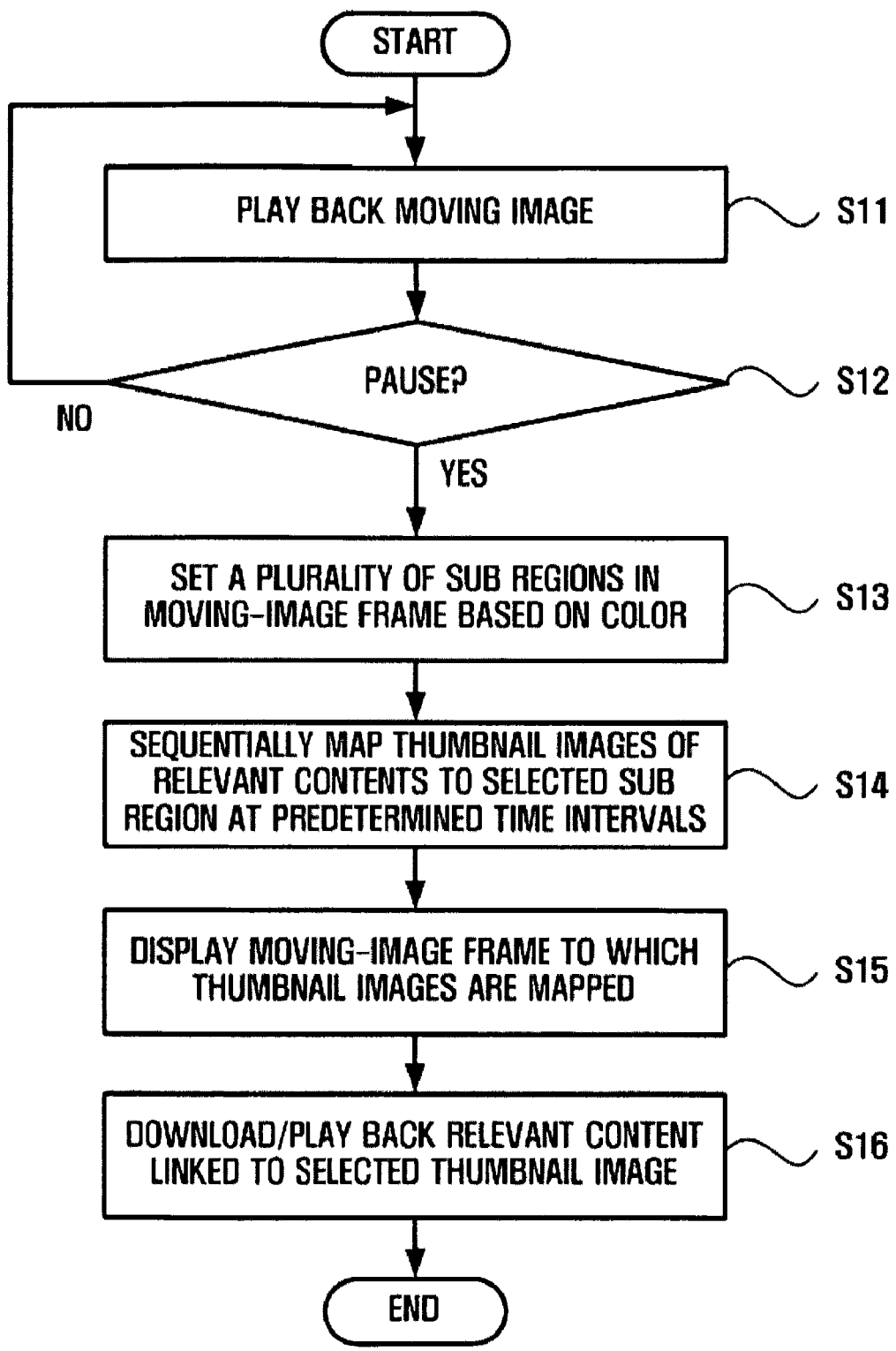
FIG. 11 is a flowchart illustrating an image display method according to another exemplary embodiment of the present invention.

FIG. 11 is a flowchart illustrating an image display method according to another exemplary embodiment of the present invention.

Referring to FIG. 11, if a pause command is input while a moving image is being played back (yes to a question raised in operation S12), a plurality of sub regions may be set based on color in a moving-image frame at a time when the pause command is input (operation S13). Operation S13 may include converting a signal format of the moving-image frame into a reference signal format in order to set sub regions, detecting a facial region in the moving-image frame in the reference format, putting pixels, which have values within a predetermined range, from among pixels included in a background region excluding the facial region in a group, and setting the group as a sub region.

If the sub regions are set (operation S13), all thumbnail images of relevant contents of the moving image being played back may be sequentially mapped to a sub region, which is selected from the set sub regions, at predetermined time intervals (operation S14). Operation 14 may include extracting a keyword required to search for the relevant contents, searching for the relevant contents using the extracted keyword, classifying the found contents by category, generating thumbnail images of the relevant contents which are classified by category, selecting a sub region which is larger than the set sub regions, and sequentially mapping the generated thumbnail images to the selected sub region at predetermined time intervals.

Here, the generating of the thumbnail images may include adjusting the clearness of a thumbnail image of each relevant content according to the number of times that the relevant content has been used.

Then, the moving-image frame, in which the thumbnail images in each category have sequentially been mapped to the selected sub region, may be displayed on, for example, a display module (operation S15).

When one of the displayed thumbnail images is selected, a relevant content linked to the selected thumbnail image may be downloaded or played back (operation S16).

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented to execute one or more central processing units (CPUs) in a device or a security multimedia card.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in descriptive sense only and not for purposes of limitation.

What is claimed is:

1. An image display apparatus comprising:
   a setting module to set a plurality of sub regions into which a predetermined image frame of an image being played back are divided;
   a thumbnail image generating module to generate one or more thumbnail images of one or more relevant contents related to the image;
   a mapping module to map the one or more thumbnail images of the one or more relevant contents related to the image to one or more sub regions selected from the sub regions; and
   an execution module to download, when the one or more thumbnail images are selected from the one or more mapped thumbnail images, one or more relevant contents corresponding to the one or more thumbnail images,
   wherein, the thumbnail image generating module adjusts a relative size of the one or more thumbnail images according to a respective size of each of the one or more selected sub regions and according to a respective number of one or more relevant contents which correspond to the one or more thumbnail images.

2. The apparatus of claim 1, further comprising:
   a search module to search for the one or more relevant contents using one or more keywords extracted from the image,
   wherein the one or more keywords are at least one of title, genre, producer, provider and main character of the image.

3. The apparatus of claim 1, wherein the thumbnail image generating module decreases the clearness of the one or more thumbnail images of the one or more relevant contents as the number of times that the one or more relevant contents is used increases.

4. The apparatus of claim 2, wherein, when the found one or more relevant contents are classified by category, the thumbnail image generating module reduces the size of the one or more thumbnail images of the one or more relevant contents in a category as the number of the one or more relevant contents in the category increases.

5. The apparatus of claim 2, wherein the setting module puts pixels, which have values within a predetermined range, from among pixels included in a background region excluding a facial region of the image in a group and sets the group as a sub region.

6. The apparatus of claim 2, wherein, when the found one or more relevant contents are classified by category, the mapping module maps the one or more thumbnail images in a category, which has a greater number of relevant contents than other categories, to a larger sub region.

7. The apparatus of claim 1, wherein the mapping module simultaneously maps the one or more thumbnail images to the selected one or more sub regions or sequentially maps the one or more thumbnail images to the selected one or more sub regions to be sequentially displayed at predetermined time intervals.

8. The apparatus of claim 1, wherein, when the image being played back is a moving image, the setting module sets the sub regions in an image frame at a time when the moving image is temporarily stopped.

9. The apparatus of claim 8, wherein the one or more relevant contents are at least one of other frames in the moving images, other moving images, still images, music, articles, books and websites which are related to the image being played back.

10. The apparatus of claim 2 further comprising an extraction module to extract one or more keywords from the image when a predetermined command is received, and the search module searches for the relevant contents via an Internet network connection, using each of the extracted keywords,
    wherein the predetermined command includes a pause command.

11. The apparatus of claim 1 wherein, when the one or more thumbnail images are selected from the one or more mapped thumbnail images, the execution module plays back one or more relevant contents corresponding to the one or more thumbnail images.

12. An image display method comprising:
    setting a plurality of sub regions into which a predetermined image frame of an image being played back are divided;
    generating one or more thumbnail images of one or more relevant contents related to the mapping the one or more thumbnail images of the one or more relevant contents related to the image to one or more sub regions selected from the sub regions; and
    downloading, when the one or more thumbnail images are selected from the one or more mapped thumbnail images, one or more relevant contents corresponding to the one or more thumbnail images,
    wherein, the generating comprises adjusting a relative size of the one or more thumbnail images according to a respective size of each of the one or more selected sub regions and according to a respective number of one or more relevant contents which correspond to the one or more thumbnail images.

13. The method of claim 12, further comprising:
    searching for the one or more relevant contents using one or more keywords extracted from the image,
    wherein the one or more keywords are at least one of title, genre, producer, provider and main character of the image.

14. The method of claim 13, wherein the generating of the one or more thumbnail images comprises decreasing the clearness of the one or more thumbnail images of the one or more relevant contents as the number of times that the one or more relevant contents is used increases.

15. The method of claim 13, wherein, when the one or more found relevant contents are classified by category, the generating of the one or more thumbnail images comprises reducing the size of the one or more thumbnail images of the one or more relevant contents in a category as the number of the one or more relevant contents in the category increases.

16. The method of claim 13, wherein the setting of the sub regions comprises putting pixels, which have values within a predetermined range, from among pixels included in a background region excluding a facial region of the image in a group and setting the group as a sub region.

17. The method of claim 13, wherein, when the found one or more relevant contents are classified by category, the mapping of the one or more thumbnail images comprises mapping one or more thumbnail images in a category, which has a greater number of relevant contents than other categories, to a larger sub region.

18. The method of claim 12, wherein the mapping of the one or more thumbnail images comprises simultaneously mapping the one or more thumbnail images to the selected one or more sub regions or sequentially mapping the one or more thumbnail images to the selected one or more sub regions to be displayed at predetermined time intervals.

19. The method of claim 12, wherein, when the image being played back is a moving image, the setting of the sub regions comprises setting the sub regions in an image frame at a time when the moving image is temporarily stopped.

20. The method of claim 19, wherein the one or more relevant contents are at least one of other frames in the moving images, other moving images, still images, music, articles, books and websites which are related to the image being played back.

21. The method of claim 12 further comprising playing back, when the one or more thumbnail images are selected from the one or more mapped thumbnail images, one or more relevant contents corresponding to one or more thumbnail images.

22. At least one non-transitory computer-readable storage medium storing computer program instructions that control at least one processor to implement the method of claim 12.

* * * * *